United States Patent [19]

Robertson, Sr.

[11] 3,759,332

[45] Sept. 18, 1973

[54] EXTRA HEAVY DUTY MULTI-DISC HARROW WITH AUTOMATIC LEVEL CONTROL

[76] Inventor: Jackson P. Robertson, Sr., Rt. 1, Box 218, Steens, Miss. 39766

[22] Filed: Dec. 9, 1970

[21] Appl. No.: 96,562

[52] U.S. Cl................. 172/239, 172/413, 172/595, 172/776
[51] Int. Cl............................................. A01b 63/11
[58] Field of Search..................... 172/579, 311, 413, 172/594, 595, 455, 776, 427, 239

[56] References Cited
UNITED STATES PATENTS

| | | | |
|---|---|---|---|
| 3,604,378 | 9/1971 | McDaniel | 172/427 X |
| 2,059,205 | 11/1936 | Buffington | 172/413 X |
| 2,800,757 | 7/1957 | Tufford | 172/595 |
| 2,840,971 | 7/1958 | Greeson | 172/413 X |
| 2,857,724 | 10/1958 | Kenney et al. | 172/776 X |
| 3,014,541 | 12/1961 | Oehler et al. | 172/455 X |
| 3,213,946 | 10/1965 | Carrick | 172/595 X |
| 3,297,097 | 1/1967 | Pryor | 172/595 |
| 3,327,787 | 6/1967 | Adee | 172/595 X |

FOREIGN PATENTS OR APPLICATIONS

| | | | |
|---|---|---|---|
| 234,808 | 8/1961 | Australia | 172/455 |

*Primary Examiner*—Robert E. Pulfrey
*Assistant Examiner*—Stephen C. Pellegrino
*Attorney*—Bacon & Thomas

[57] ABSTRACT

Agricultural machine adaptable for use as a multi-disc harrow having a longitudinally rigid, but transversely and diagonally flexible main frame assembled from prefabricated front, rear, left and right frame sections, each of which sections includes longitudinal and transverse components welded together. The front and rear sections are disposed between the left and right sections at the forward and rear ends thereof. The sections are joined together by bolts, instead of being welded to each other, to provide the aforesaid flexibility, while eliminating failure in materials and welded joints which would occur if the frame sections were welded together.

The main frame assembly is supported by a retractable wheel carriage assembly wherein the wheels are adjustable to raise the frame for transport, or to control the depth of operation of the implements carried by the frame. A leveling mechanism is interposed between the carriage assembly and a draw bar connected to the front frame section and automatically functions to maintain the main frame level with the ground at all times.

7 Claims, 12 Drawing Figures

United States Patent [19]
Robertson, Sr.
[11] 3,759,332
[45] Sept. 18, 1973
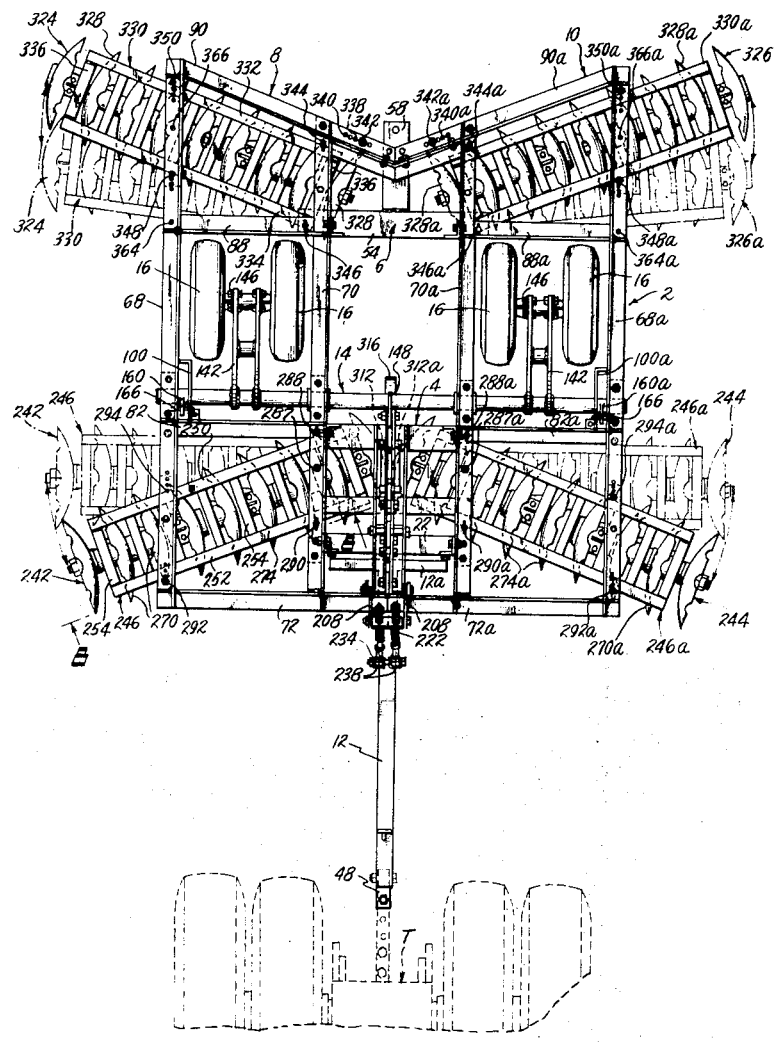

INVENTOR.
JACKSON P. ROBERTSON, SR.
BY
Bacon & Thomas
ATTORNEYS

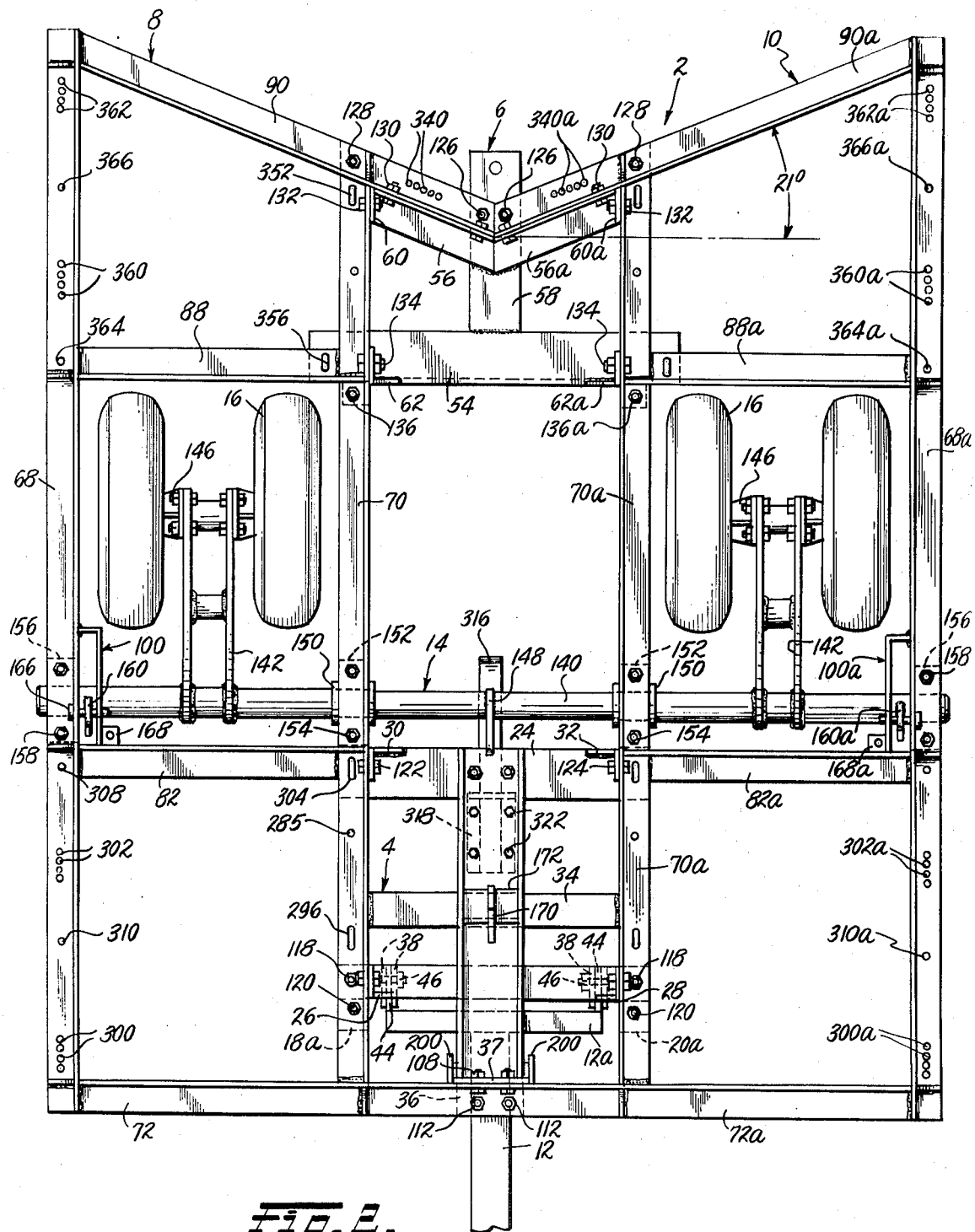

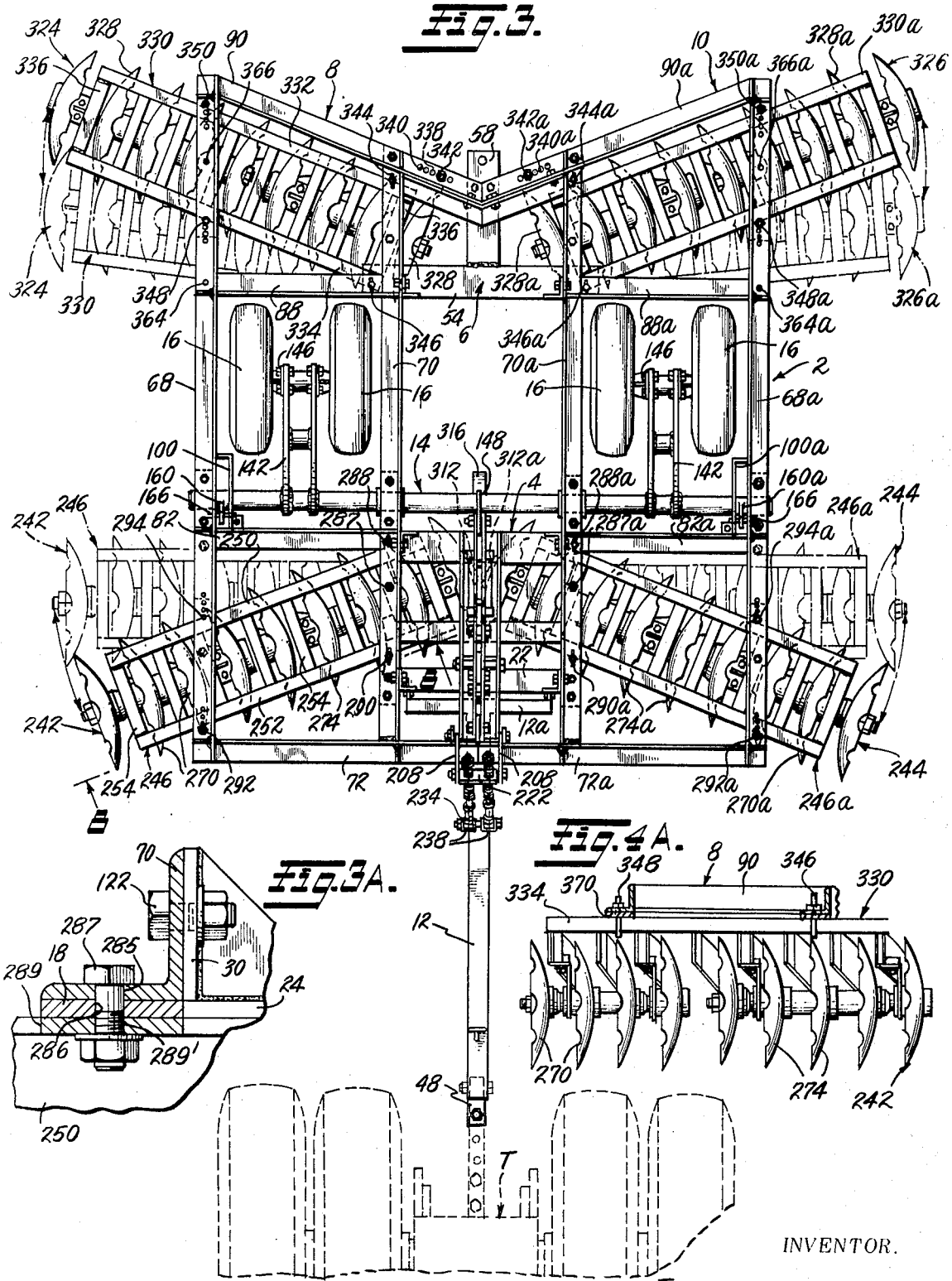

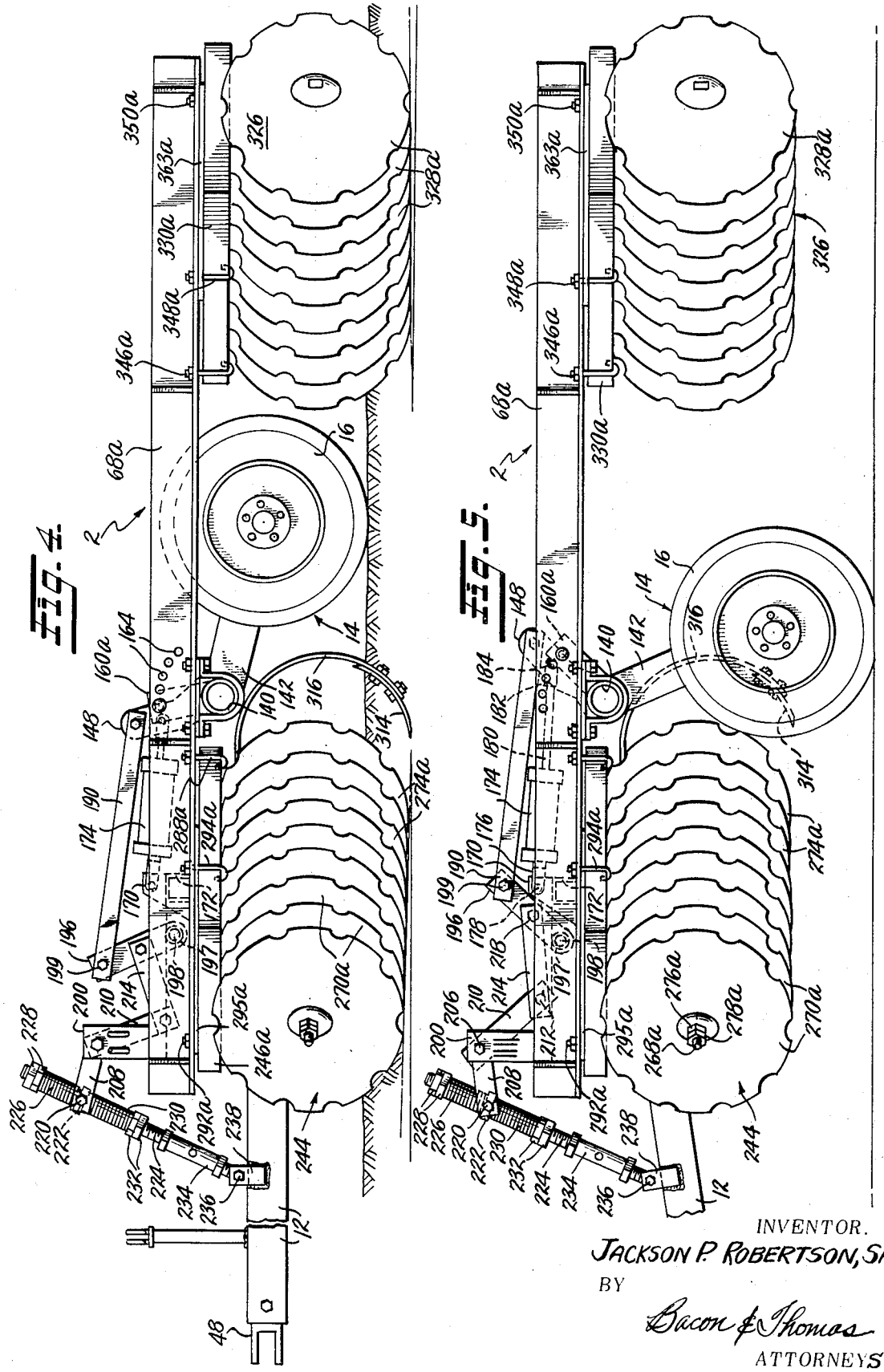

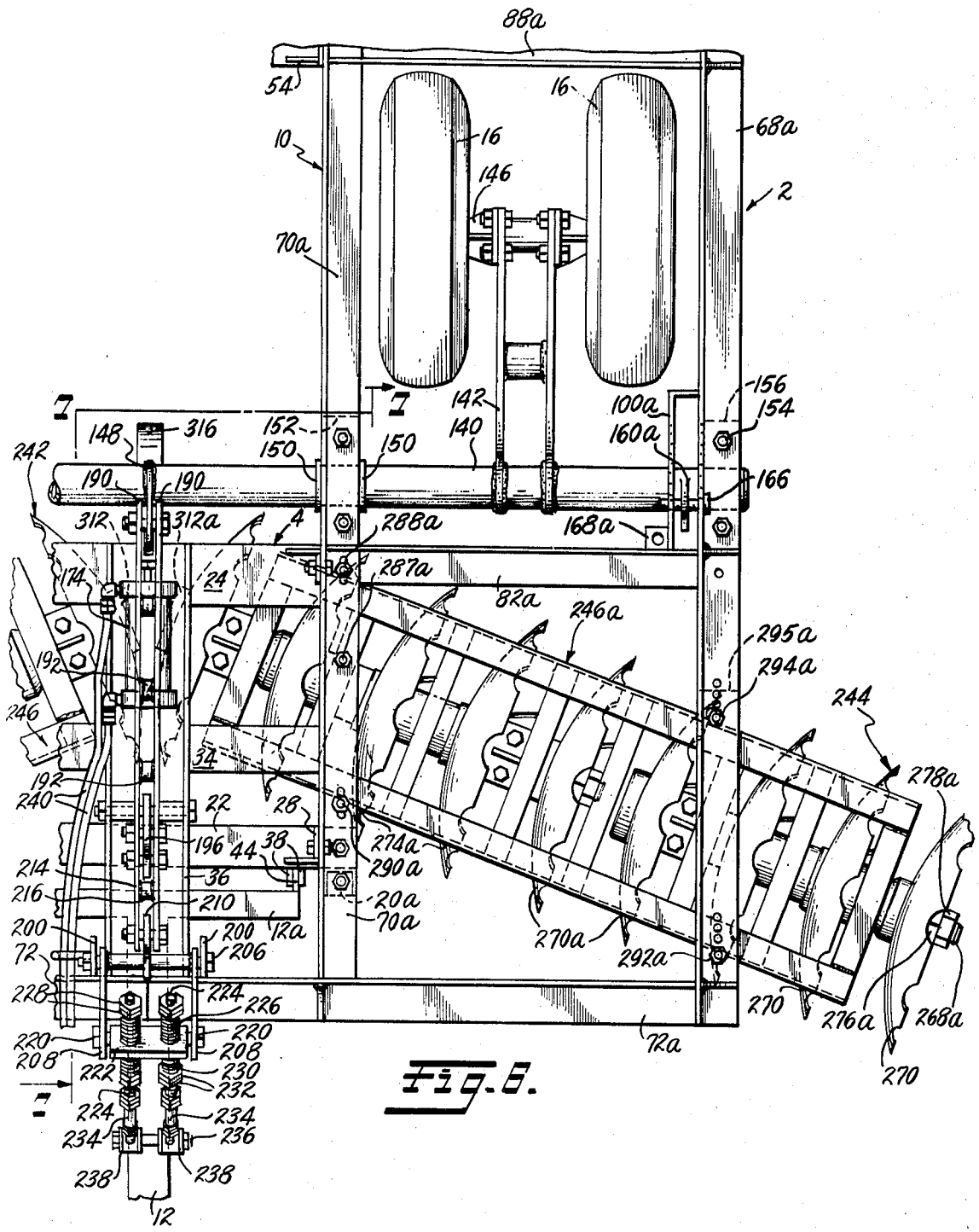

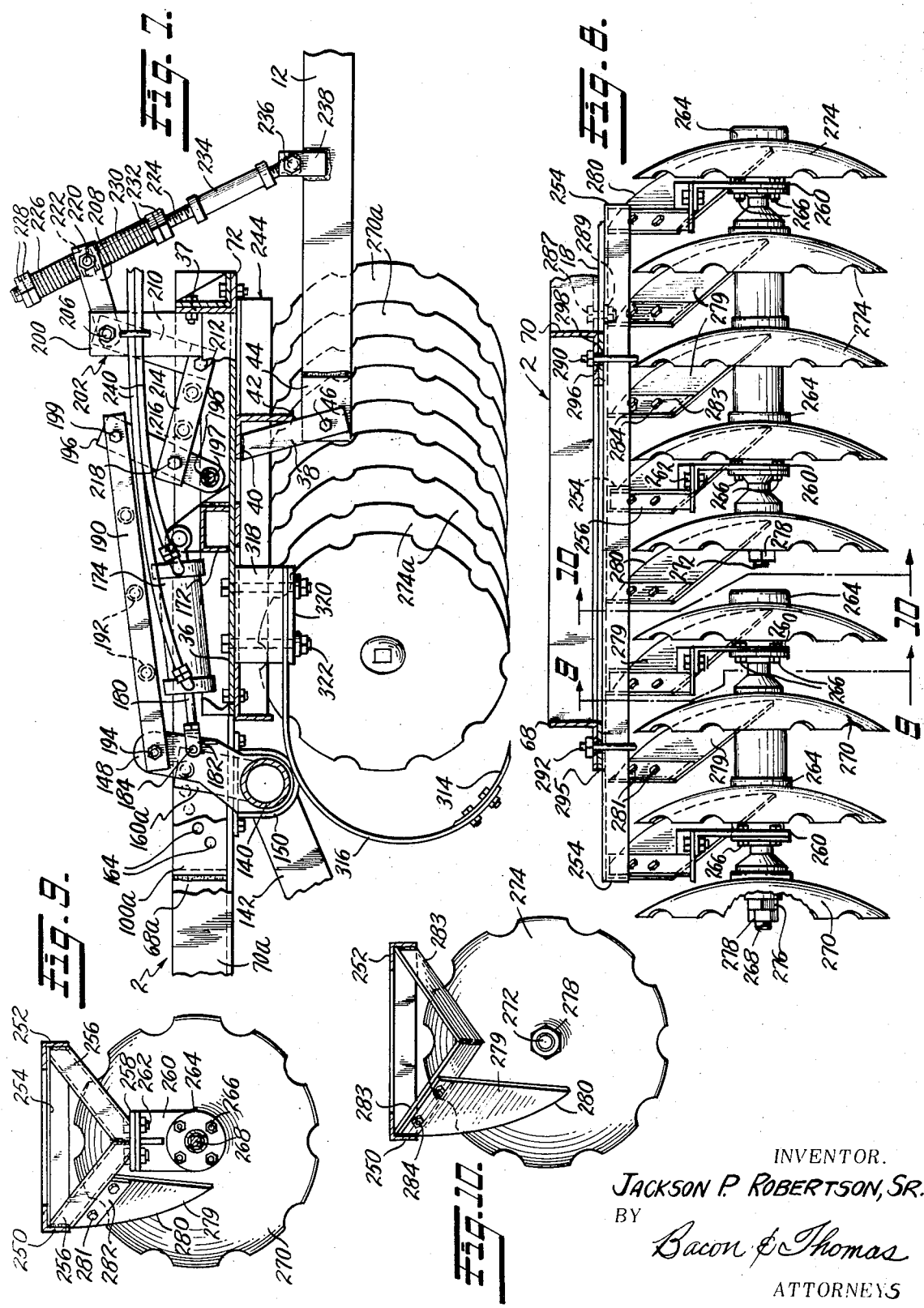

EXTRA HEAVY DUTY MULTI-DISC HARROW WITH AUTOMATIC LEVEL CONTROL

FIELD OF THE INVENTION

The present invention relates to agricultural equipment and more particularly to an extra heavy duty cutting and plowing, multi gang, disc harrow.

DESCRIPTION OF THE PRIOR ART

Various types of multiple disc harrows have been heretofore proposed for use in preparing soil for planting, but many of these are unsatisfactory for use on land which has become overgrown with high weeds and/or light brush.

Another objection to prior multi disc harrows is that the frame structures are usually all welded and are substantially inflexible, and therefor, do not yield transversely or diagonally to conform with variations in ground level, and as a result penetration of the implements into the soil to a uniform depth cannot be attained. This is particularly true of wide frames carrying tandem gangs of discs.

Another objection to prior multi disc harrow devices of the tandem type is that, frequently, either a front or rear gang of discs will penetrate to a greater depth than the others for failure of the harrow frame to control the depth of penetration and remain in a level condition, or closely follow variations in ground level.

SUMMARY OF THE INVENTION

The present invention overcomes the foregoing objections in that it provides a main frame construction that is rigid in a longitudinal direction, but can flex transversely from one side to the other, or diagonally from one corner with respect to a diagonally opposite corner, as it is being pulled across a field, thereby allowing the frame to remain at a substantially uniform height above the ground for the full length and width of the area being cultivated by the gangs of discs carried by the main frame. In this connection, the present frame comprises prefabricated front, rear, left and right sections, each including longitudinal and transverse components that are welded together.

The front and rear sections are disposed between the left and right sections in longitudinally spaced relation, and adjacent components of the frame sections are bolted together. The bolting together of the unitary sections, instead of welding them together, permits such relative movement as may be necessary to enable the main frame as a whole to flex transversely and diagonally in following the contour of the land. The main frame is pivotally mounted upon a dual wheel carriage assembly for transport and for controlling the depth of penetration of the harrow discs, and is designed so that it can be locked in any one of several desired positions. A draft control equalizer or leveling unit is mounted on the front section and interconnects the wheel carriage assembly with a draft bar, so as to maintain an absolutely level position of the frame relative to the ground at all times.

The frame sections are also designed to provide for an adjustable mounting of the harrow gang frames, so that the inside bumpers on the forward gangs remain at a substantially constant distance apart throughout the angle of adjustment of the gang frames, from minimum to maximum. The main frame is also designed so that the gangs of discs can be mounted thereon with a desired camber, i.e., in a plane non-parallel to the plane of the main frame, whereby the outboard discs are higher than the inboard discs, so that the natural tendency of the inclined axis of the discs is to cause the discs to penetrate more deeply into the soil than would be the case if the axis of the discs were parallel to the plane of the main frame. The mounting arrangement is also such that the gang frames can be angularly adjusted relative to the main frame to the extent necessary to provide the desired caster, i.e., toe-in and toe-out, for the discs. Furthermore, the mounting for the front gangs of harrows is such that the distance between the bumpers at the adjacent inner ends of the gangs remains substantially constant throughout the range of angular adjustment. This eliminates the necessity of providing a series of lateral adjustments. The gang frames are also mounted so that the inboard discs are close to each other and eliminate the forming of a ridge of substantial width between the areas that are worked by the disc blades. Hence, only a single spring tooth assembly is mounted on the main frame between the inner ends of the front gangs.

Accordingly, the principal object of the invention is to provide a multi disc harrow having a main frame that is very strong and rigid, but, nevertheless, flexible transversely while substantially inflexible longitudinally so that it can flex up and down transversely and diagonally from one corner in relation to the other corners.

Another object is to provide a frame consisting of umitary sections having the components thereof welded together for rigidity and wherein the sections are bolted together near the center of the assembly to provide the desired flexibility.

Another object is to provide a main frame for agricultural equipment comprising front, rear, left and right frame sections, each having the longitudinal and transverse components thereof welded together for rigidity, and wherein the frame sections are secured together by bolts to provide the desired flexibility, while eliminating failures in the material or in the welded joints.

Another object is to provide mounting means for implement gang frames designed so that the gangs can be adjusted angularly throughout their possible extent of adjustment, without the necessity of adjusting the gang frames crosswise to prevent interference with each other.

A further object is to provide a multi disc harrow with a wheel carriage assembly having dual wheels for transport and for controlling the depth of penetration of the disc blades, etc., and which can be locked in any one of several desired positions of adjustment.

A still further object is to provide a draft control equalizer or leveling unit for general use on agricultural implements, which will automatically maintain an absolutely level position and also maintain an equalization draft control of the implement frame relative to the ground at all times.

Still another object is to provide adjustable mounting means for gang disc frames arranged so that the inside bumpers remain a substantially constant distance apart throughout the range of angular adjustment of the gang frames.

A further object is to locate and anchor the in-board end of the rear gang frames at a pivot point that will maintain substantially the same distance between the trailing edges of the in-board disc blades on the left and right sides throughout the full extent of the angular adjustment of the gang frames.

Another object is to provide a main frame for a multi disc harrow including provision for adjusting the pivot point of the rear gang frames toward or away from each other to suit different sizes of discs and concavities of disc blades and for different tractor speeds.

Another object is to provide a main frame for a multi disc harrow, wherein the pivot bolts for the gang frames are located directly above or substantially in line with the rear trailing edges of the in-board discs on both the left and right hand sides of the center of the main frame.

A still further object is to provide means for establishing castor and camber of the disc blades in relation to their contact with the soil that they turn over.

Another object is to provide a multi disc harrow wherein toe-in is provided for the front gangs, and toe-out is provided for the rear gangs so that efficient working of the soil can be jointly effected by said gangs.

Still another object is to provide a wheel carriage assembly for use with a multi-disc harrow frame, or other frame, that will propel or produce a forward motion to the main frame as it is lowered toward the ground.

Other objects and advantages of the invention will be apparent from the following description taken in conjunction with the accompanying drawings.

DESCRIPTION OF THE DRAWINGS

FIG. 2 is a plan view of the assembled main frame and wheel carriage.

FIG. 3 is a plan view of a multi-disc harrow including the main frame shown in FIG. 1, with portions of the gangs of discs shown in dot-and-dash lines to indicate their range of angular adjustment.

FIG. 3A is a fragmentary sectional view, taken on the line 3A—3A of FIG. 3.

FIG. 4 is an enlarged right side elevational view of the harrow showing the discs in their lowered operating position.

FIG. 4A is a fragmentary view showing plates between the main frame and gang frame to vary the camber of the discs.

FIG. 5 is a view similar to FIG. 4, but showing the wheels of the carriage extended and the main frame and discs raised to transport position.

FIG. 6 is an enlarged fragmentary view of the left, front end of the disc harrow shown in FIG. 3.

FIG. 7 is a fragmentary vertical sectional view, taken on the line 7—7 of FIG. 6, and particularly illustrating certain details of the frame leveling mechanism.

FIG. 8 is an enlarged vertical sectional view, taken on the Line 8—8 of FIG. 3, and particularly showing the mounting means for the gang frame and the brackets for mounting the gangs of harrows thereon and the scraper blades for keeping the discs clean.

FIG. 9 is an enlarged vertical sectional view, taken on the line 9—9 of FIG. 8, and illustrating further details of the mounting for one of the gangs, and the mounting for one of the scraper blades.

FIG. 10 is a vertical sectional view, taken on the line 10—10 of FIG. 8, showing further details of the mounting means for one of the scraper blades.

DESCRIPTION OF THE PREFERRED EMBODIMENT

Figure 1:
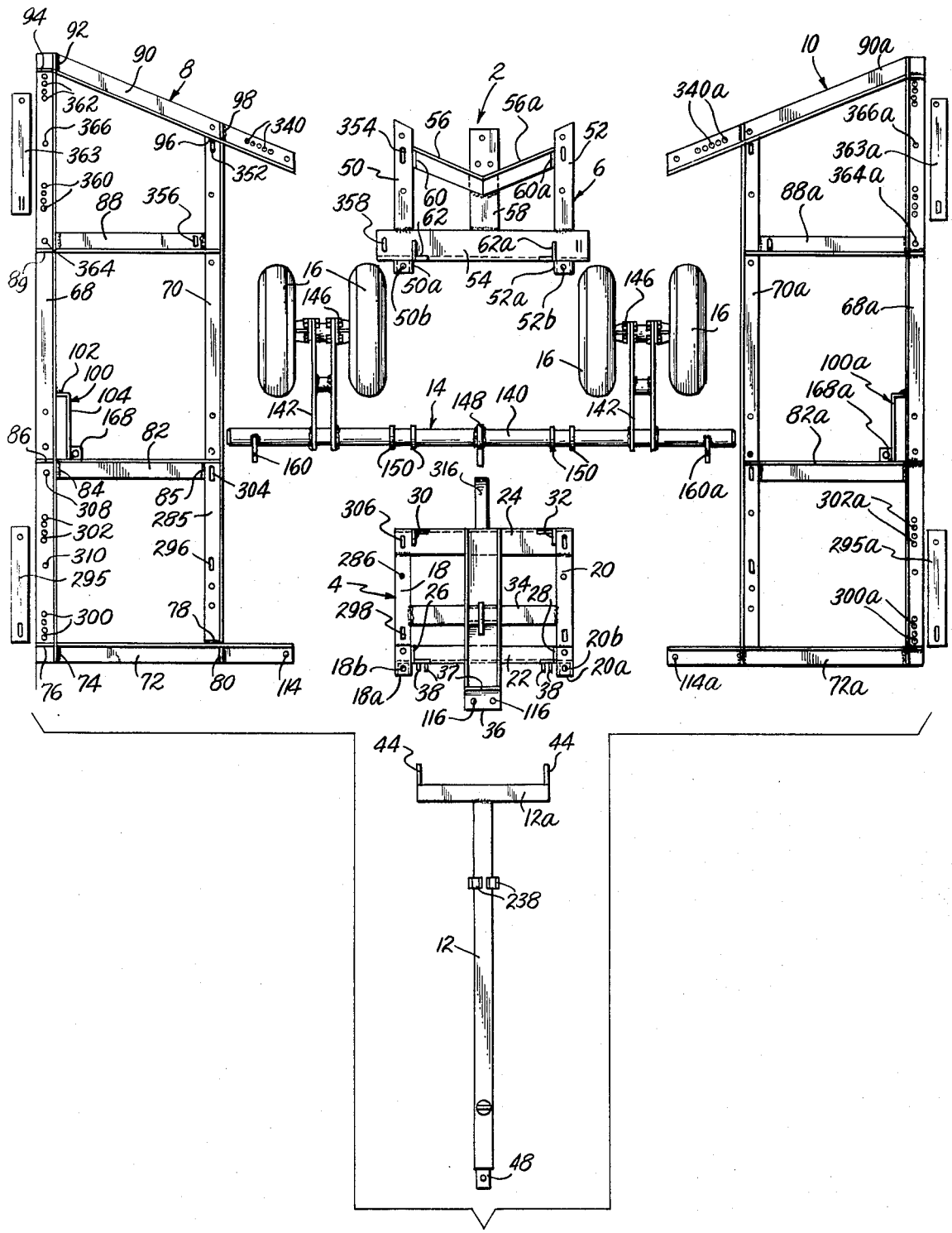
FIG. 1 is an exploded view showing the front, rear, left and right sections of the main frame, and the dual wheel carriage assembly for mounting the main frame.

Referring to FIGS. 1 and 2, the main frame of the multiple-disc harrow is generally identified by the numeral 2 and comprises a front frame section 4, a rear frame section 6, a right frame section 8 and a left frame section 10. A draft bar 12 is connected to the front frame section 4, as will be described later. A wheel carriage assembly 14, including two sets of dual wheels 16 is connected with the left and right frame sections, as will also be described more fully hereinafter.

It will be understood that each of the frame sections 4, 6, 8 and 10 is fabricated as a separate unit by welding together the components thereof, and that these units can be readily shipped, and assembled to form the main frame 2 of the harrow after they reach their destination.

The front frame section 4 comprises two longitudinal flat iron members 18 and 20 that are inter connected at their forward end by the horizontal leg of an angle iron 22 and at their rear end by the horizontal leg of another angle iron 24, the other leg of both the angle irons 22 and 24 extending downwardly. Brackets 26 and 28 are welded to the horizontal leg of the angle iron 22 and are spaced inwardly from the extremities thereof a distance equal to the width of the flat members 18 and 20. Similar brackets 30 and 32 are likewise welded to the horizontal leg of the angle iron 24. One intermediate transverse flat bar 34 is connected at its opposite ends to the flat members 18 and 20. A channel member 36 is welded along its longitudinal edges to the transverse members 22, 24 and 34. The channel member 36 constitutes the base of an automatic leveling device that will be described in detail later. The sides of the channel 36 are cut away at the forward end thereof and a plate 37 is welded thereto.

Two sets of bars 38, FIGS. 2 and 7, are vertically inclined, and their upper ends are welded at 40 to the horizontal leg of the angle iron 22. The bars 38 are also welded to the lower edge of the vertical leg of the angle iron 22 as indicated at 42. The draft bar 12 is hollow and rectangular in cross-section, and includes a cross bar 12a that has welded extensions 44 extending rearwardly therefrom and which are received, one between each of the pairs of bars 38. The extensions 44 are pivotally connected to the bars 38 by bolts 46. The opposite end of the draft bar 12 has a yoke 48 attached thereto for connecting the same to a tractor T, FIG. 3. A short length of channel 18a and 20a is welded to the angle iron 22 in alignment with the flat members 18 and 20, respectively, and each has an opening 18b and 20b for a purpose described later.

The rear frame section 6, FIG. 1, comprises longitudinal flat iron members 50 and 52 connected at their forward ends to the horizontal leg of an angle iron 54. The longitudinal members 50 and 52 are connected adjacent their rear ends by two angularly disposed angle irons 56 and 56a that overlie a flat plate 58, the forward end of which is welded to the edge of the horizontal flange of the angle iron 54. A pair of vertical plates 60 and 60a is welded to the angle members 56 and 56a, respectively, at the extremities thereof and in a plane coinciding with the inner edges of the members 50 and 52. Vertical brackets 62 and 62a are secured to the top of the horizontal of the leg of the angle member 54, their outer edges being aligned with the inner edges of the members 50 and 52. Short channel sections 50a and 52a are welded to the vertical leg of the angle member 54 in alignment with the flat members 50 and 52a, respectively, and each is provided with an opening 50b and 52 b, respectively, for a purpose to be described later.

The right frame section 8 comprises parallel longitudinal outer and inner angle irons 68 and 70 connected together at their forward end by a transverse angle iron 72. The angle iron 72 is welded at one end to the inner face of the vertical flange of the angle iron 68, as indicated at 74. A triangular gusset 76 is welded to the angle iron 68 in longitudinal alignment with the vertical leg of the angle iron 72. The angle iron 72 extends inwardly beyond the angle iron 70 and has its vertical leg welded to the end face of the angle iron 70, as indicated at 78, and a triangular gusset 80 is welded to the angle iron 72 in alignment with the vertical leg of the angle iron 70. An intermediate transverse angle iron 82 has its left end welded in abutting engagement with the vertical leg of the longitudinal angle iron 68, as indicated at 84. A portion of the horizontal leg of the angle iron 82 is cut away to clear the horizontal leg of the angle iron 70 and is butt welded to said leg at 85, while the vertical flange of the angle iron 82 is welded to both legs of the angle iron 70. A gusset 86 is welded to the angle iron 68 in alignment with the vertical flange of the angle iron 82. A similar transverse angle iron 88 interconnects the longitudinal angle irons 68 and 70 in a region spaced from the rear ends of said angle irons and a gusset 89 is welded to the angle iron 68 in alignment with the vertical leg of the angle iron 88.

The inner longitudinal angle iron 70 is shorter than the outer longitudinal angle iron 68 and the rear extremities thereof are connected by an angle iron 90, which is of sufficient length to extend inwardly beyond the angle iron 70. The left end of the angle iron 90 is cut on an angle and is welded to the inner face of the vertical flange of the angle iron 68, as indicated at 92. A gusset plate 94 is mounted on an angle iron 68 in general alignment with the vertical leg of the angle member 90.

The rear end of the angle iron 70 is cut on an angle and is welded at 96 to the vertical flange of the angle member 90. A gusset 98 is welded to the angle iron 90 in alignment with the vertical flange of the angle member 70. It will be understood that the gussets 76, 80, 86, 89, 94 and 98 serve to stiffen the angle irons to which they are welded.

An inverted L-shaped member 100 has a short lateral leg 102 that is welded to the vertical flange of the longitudinal angle iron 68 and a longitudinal leg 104 that is welded to the vertical flange of the angle iron 82. The L-shaped member 100 cooperates with the angle iron 68 to provide an open box, the purpose of which will be explained later.

The left frame section 10 is identical to the right frame section 8, but is reversed in construction, and parts thereof corresponding to those already described have been identified by the same numbers applied to the parts of the frame 8, except that the letter a has been added thereto.

FIG. 2 shows the frame sections 4, 6, 8 and 10 in assembled relation to form the main frame 2. In assembling the main frame 2, the forward transverse angle irons 72 and 72a of the frame sections 8 and 10 are positioned with their ends in engagement and are connected together by bolts 108 extending through the vertical legs thereof and through the plate 37 mounted on the channel member 36. Additional bolts 112 extend through openings 114 and 114a in the angle members 72 and 72a and through openings 116 in the channel member 36.

The inner longitudinal members 70 and 70a of the frame sections 8 and 10 overlie the flat members 18 and 20 and the end portions of the horizontal flanges of the angle irons 22 and 24 of the front frame section 4, and are secured thereto by bolts 118 and 120, the body of which extend through the openings 18b and 20b in the channel sections 18a and 20a. The angle iron 70 is secured to the brackets 26 and 30 by bolts 122. The brackets 28 and 32 are secured to the vertical flange of the angle iron 70a by bolts 124.

When the ends of the front angle irons 72 and 72a are placed in abutting relation as described above, the ends of the rear angle irons 90 and 90a will also abut. The rear frame section 6 is then positioned with the flat members 50 and 52 underlying the angle irons 70 and 70a, respectively, and with the vertical leg of the angle irons 56 and 56a engaging the front side of the vertical legs of the angle irons 90 and 90a. The overlying members have aligned openings so that bolts 126 secure th extended portions of the angle irons 90 and 90a to the central flat member 58. Additional bolts 128 secure the horizontal leg of the angle irons 90 and 90a to the underlying ends of the longitudinal angle irons 70 and 70a and the flat members 50 and 52. The vertical flanges of the angle irons 90 and 90a are secured by bolts 130 to the vertical flanges of the angle irons 56 and 56a. The plates 60 and 60a are secured by bolts 132 to the vertical flanges of the angle irons 70 and 70a, respectively. These vertical flanges are also secured to the brackets 62 and 62a by bolts 134. The horizontal flanges of the angle irons 70 and 70a are secured to the channel sections 50a and 52a by bolts 136 passing through the openings 50b and 52b, respectively. The rear angle irons 90 and 90a are disposed on an angle of about 21° and converge forwardly. Hence, they serve as angular braces and stiffen the main frame 2, to better resist the stress imposed thereon while the device is in use and is being drawn over a field. Bolts 136 and 136a additionally secure the angle irons 70 and 70a to the underlying flat members 50 and 52.

The carriage wheel assembly 14 comprises a tubular shaft 140 to which two pairs of arms 142 are welded in spaced relation. The arms 142 carry brackets 146 supporting axles (not shown), upon which the wheels 16 are rotatably mounted. A lever 148 is welded to the shaft 140 at the mid point thereof. Stop collars 150 are welded to the shaft 140 and are disposed on opposite sides of pillow block bearings 152 secured by bolts 154 to the inner longitudinal angle irons 70 and 70a. A similar pillow block 156 is secured to each of the outer angle irons 68 and 68a by bolts 158. Projections 160 and 160a are welded adjacent each end of the shaft 140, and are located so that when the shaft 140 is assembled with the main frame 2, the projections 160 and 160a will extend into the boxes formed by the members 100 and 100a, respectively. Each of the projections 160 and 160a has an opening 162 formed therein, FIG. 6, and the vertical flange of the angle irons 70 and 70a and the longitudinal leg 104 and 104a of the members 100 and 100a have spaced, aligned openings 164 therein to receive a pin 166, FIGS. 3 and 6. The pins 166 hold the shaft 140, and hence, the wheels 16, in any one of several possible positions of adjustment. The pins 166 when not in use can be stowed in apertured plates 168 and 168a, respectively, welded in place at the junctures of the member 100 and the transverse member 62, and the member 100a and the transverse member 82a, respectively.

FIGS. 3 to 7 illustrate the details of the automatic leveler or depth control unit. As is here shown, the channel 36 has a pivot plate 170 welded to its base and braced on either side thereof by short channel sections 172 welded to the pivot plate 170 and to the adjacent sides of the channel 36. A hydraulic cylinder 174 has a yoke 176 at one end thereof connected to the pivot plate 170 by a pin 178. A piston rod 180 projects from the opposite end of the cylinder 174 and is pivotally connected by a yoke 182 and a pin 184 to the lever 148 on the carriage shaft 140. A pair of links 190, having a plurality of spacers 192 therebetween, is connected at one end thereof to the lever 148 by a bolt 194.

A fulcrum lever 196 is welded at its lower end to a sleeve 197 which is pivotally mounted on a bolt 198 extending through the sides of the channel 36. The upper end of the fulcrum lever 196 is pivotally connected by a bolt 199 to the opposite end of the links 190.

A pair of uprights 200 is welded to the outer face of the sides of the channel member 36 adjacent to the transverse plate 37. A bell crank 202 comprises a sleeve 204, which is pivotally mounted on the uprights 200 by a bolt 206. The bell crank 202 has forwardly extending arms 208 welded to the opposite ends of the sleeve 204, and a rearwardly extending arm 210 welded to the mid point of the sleeve. The lower end of the arm 210 is connected by a bolt 212 to a pair of links 214 having spacers 216 therebetween. The other ends of the links 214 are connected to the fulcrum lever 196 by a bolt 218.

The arms 208 of the bell crank 202 are connected at their forward ends to shouldered bolts 220 extending from the opposite ends of a block 222. A pair of threaded members 224 extend through bores in the block 222, and each has a spring 226 disposed above the block 222 and retained in place by adjusting nuts 228. Similar springs 230 and adjusting nuts 232 are mounted upon each of the members 224 below the block 222. Thus, the block 222 is slidably mounted upon the members 224. As will be apparent from FIG. 6, the nuts 228 and 232 can be adjusted to provide uniform compression of the springs 236 and 230. respectively, above, and below the slidable block 222. The lower end of each of the members 224 is connected to a turnbuckle 234, the lower end of which is pivotally connected by a bolt 236 with yokes 238 projecting upwardly from the draw bar 12. The turnbuckles 224 are provided to adjust the free end of the draw bar 12 to suit the height of the hitch on various sizes and makes of tractors.

Hydraulic fluid lines 240 are connected to opposite ends of the cylinder 174 for actuating the lever 188 for raising and lowering the wheel carriage assembly 14 relative to the main frame 2. The hydraulic fluid lines 240 are connected to a pressure source on the tractor T (not shown). As will be apparent from a comparison of FIGS. 4 and 5, when the piston rod 180 is retracted and the wheel carriage assembly 14 permits the main frame 2 to be lowered, the weight of the frame 2 will react through the wheels 16 and tend to move the structure in a forward direction relative to the ground, thus momentarily relieving pull load on the draw bar 12. This is an important feature since the forward motion reduces the load on the tractor required to overcome the initial inertia of the harrow in moving the same forward. It will be apparent that repeated actuation of the cylinder 174 and the consequent raising and lowering of the main frame 2 will result in the harrow being moved forwardly step by step without pull from the tractor. If necessary, a chock (not shown) can be placed behind the wheels 16 to assure a firm abutment for the wheels.

It will be understood that the hydraulic cylinder 174 can be actuated to position the wheels 16 in any desired angular position of adjustment, so as to control the depth of the cultivating implements and/or to raise the implements clear of the ground, as shown in FIG. 5, for transport purposes.

The leveler or depth control unit described above is disposed between the draw bar 12 and the lever 148 on the wheel carriage shaft 140, and serves automatically to maintain the main frame 2 in a level position relative to the ground at all times. The springs 226 and 230 mounted on each side of the sliding bar 222 exert equal pressure on the bar tending to maintain it in a neutral position of equilibrium so long as no other force is exerted against either side of the bar 222. This leveling unit functions in the following manner:

As the lever 148 on the wheel carriage assembly 14 moves rearwardly in response to operation of the hydraulic cylinder 174, the links 190 are moved rearwardly a corresponding distance, thereby pulling the upper end of the fulcrum lever 196 in the same direction. Such movement causes the connecting link 214 to be moved toward the rear, but through a shorter distance due to the difference in the length of the moment arms of the bolts 199 and 218. The connecting links 214 pull the lower end of the arm 210 of the bell crank lever 202 backwardly and upwardly so that the front arms 208 are moved downwardly clockwise. This applies a force to the sliding bar 222 tending to move it downwardly on the members 224 against the springs 230. Consequently, a downward force is transmitted through the members 224 and turnbuckles 234 to draw bar 12, which tends to pivot about its pivot bolts 46. The springs 226 and 230 react against the draw bar 12 and tend to restore the sliding bar 222 to its initial position of equilibrium relative to the members 224. Such reaction causes leveling the main frame 2 corresponding to the particular adjustment of the wheels 16. Thus, there is a constant and equal pressure, up and down, which keeps the main frame 2 in a level position relative to the ground at all times.

Referring to FIG. 3, four gangs of harrow discs are shown mounted on the main frame 2, each set consisting of two groups of discs. Two forward gangs 242 and 244 are adjustably secured to the main frame 2 so that they can be moved from the full line position to that shown in dot-and-dash lines as will be described later. The gang 242 is mounted upon a rectangular frame 246 comprising longitudinal members 250 and 252 that are inter-connected by four transverse angle irons 254, all welded together to provide a rigid structure. Each angle iron 254 has a pair of sections of rectangular tubing 256 welded to the vertical leg thereof and converging downwardly toward each other and having their lower ends welded together and to a bracket mounting place 258, as is best shown in FIG. 9. A bracket 260 is secured to each plate 258 by bolts 262. A bearing 264 is mounted upon each bracket 260 by bolts 266. Two of the brackets support a shaft 268 carrying a group of four discs 270, and the remaining two brackets 260 support a shaft 272 carrying a group of five discs 274, FIG. 6. The shaft 268 is secured in place by a nut 276 and a lock nut 278, and the shaft 272 is similarly secured in place. The use of the locknuts 278 prevents the discs from becoming loose, which has been a serious problem heretofore. A scraper blade 279 is disposed on an angle of about 41°–45° adjacent each of the harrow discs 270 and 274 and has a peripheral portion 280 conforming in shape to the concavity of the harrow discs. Certain of the scrapers 279 are secured at their upper ends by bolts 281 to a downwardly extending bar 282 welded to the rearmost of the sections of rectangular tubing 256, FIG. 9. It will be understood that the bolts 281 adjustably support the scrapers 279 so that they can be properly positioned to remove any soil that has a tendency to adhere to the inner face of the discs 270 or 274. Supports for additional scrapers 279 are provided by welding two pieces of flat iron 283 so that they converge downwardly, as well as on an angle to the angle irons 250 and 252 and to each other, FIG. 10. A scraper 279 is adjustable secured at its supper end by bolts 284 to the rearmost piece of flat iron 283. The outermost disc 270 does not necessarily require a scraper.

The angle iron 70 of frame section 8 has an opening 285 aligned with an opening 286 in the side member 18 of the front frame section 4, and a pivot or anchor bolt 287 extends through these openings and through an opening 289' in one of the transverse members 289 of the gang frame 246 to pivotally connect the inner end portion of the gang assembly 242, to the main frame 2 (See FIG.3A).

The gang frame 246 is additionally secured to the main frame 2 by four J-bolts, 288, 290, 292 and 294, FIGS. 3 and 8. Each of the bolts 288 and 294 has a vertical shank and a hook at its lower end that extends around the lower edge of the longitudinal angle iron 250, and each of the bolts 290 and 292 extends around the lower edge of the angle iron 252. A suitably apertured flat plate 295 is disposed between the angle iron 68 and the gang frame 246. As is shown in FIG. 8, the J-bolt 290 has its shank extending through aligned elongated slots 296 and 298, respetively, in the overlying frame members 70 and 18 and draws the angle iron 252 of the gang frame 246 tightly against the frame member 18. The angle iron 68 has a series of spaced holes or openings 300 formed therein so that the J-bolt 292 can be mounted in a selected one of the openings, depending upon the angle at which the harrow gang 242 is to be mounted on the main frame 2. The J-bolt 292 also extends through the plate 295. Thus, the J-bolt 292 secures the outer portion of the angle irons 252 to the angle iron 68. The use of the plate 295 compensates for the thickness of the side member 18 of the front frame section 4, so that the gang frame 246 is mounted parallel with the main frame 2.

The angle iron 68 has a second series of spaced holes or openings 302 in any one of which the J-bolt 294 can be mounted to secure the longitudinal angle iron member 250 of the gang frame 246 to the angle iron 68. The J-bolt 294 also extends through the plate 295.

The J-bolt 288 extends through aligned elongated slots 304 and 306 in the angle irons 70 and 24, respectively, and serves to further secure the inner end portion of the angle iron 250 to the main frame 2. Since the anchor or pivot bolt 287 for the gang frame 242 is longitudinally aligned with the slots 296 and 304, these are sufficient to accommodate such shifting of the J-bolts 288 and 290 as may be necessary to secure the inner end of the narrow gang 242 in the desired angular position of adjustment.

On the other hand, the series of holes 300 and 302 provide a sufficient range of adjustment for the J-bolts 292 and 294 to secure the outer end of the gang frame 246 in a desired angular working position.

As is well known, disc gangs are adjusted to different angles depending upon soil conditions, depth of cut, diameter of the discs, tractor speed, etc. The greater the angle, the greater the cutting action will be, considering the weight of the machine, size and concavity of the discs, disc spacing, etc. An angle of about 21° gives good results with the present structure traveling at a speed of 5 to 5 ½ miles per hour while making a 13 ½ ft. wide cut. The depth of penetration may vary from 7 to 9 inches, and could be deeper with 28 inch diameter discs. In order to break up clods, instead of cutting the earth, the gang 242 can be adjusted to a position wherein it is disposed at about right angles to the draw bar 12, as is shown in dot-and-dash lines in FIG. 3.

The foregoing adjustment is attained by providing holes 308 and 310 in the angle iron 68 opposite the slots 304 and 296, respectively, in the angle iron 70.

It will be understood that the outer end of the gang frame 246 is secured in the right-angle position by moving the J-bolts 292 and 294 so that they extend through the holes 310 and 308, respectively. The pivot bolt 287 and the J-bolts 288 and 290 will have been loosened to permit the necessary angular movement of the frame 246 and then tightened.

The other front gang frame 246a is mounted upon the main frame 2 in identically the same manner as the gang frame 246. Thus, the frame 246a has a single anchor or pivot bolt 287a, and is secured to the main frame 2 by J-bolts 288a, 290a, 292a and 294a. A flat plate 296a is positioned between the frame 246a and the main frame 2. The frame 246a carries two groups of harrow discs 270a and 274a.

It will be noted from FIGS. 3 and 6, that the bumpers 312 and 312a on the inboard ends of the gangs of harrows 242 and 244 are slightly spaced apart, and that this spacing is maintained substantially uniform regardless of the relative angles upon which the harrow gangs 242 and 244 are disposed. This means that the innermost harrow discs are positioned quite close together so that only a narrow ridge of earth is left in the field as the harrow is drawn thereover. However, as such ridge is formed, it is removed by a tooth 314, FIG. 7, which has a resilient shank 316 secured to the lower face of the channel 36 by a spacer 318, a clamping plate 320, and bolts 322. It will be noted that the point of the tooth 314 is disposed in approximately the same plane as the lowermost edge of the inboard harrow discs 274 and 274a.

The pivot or anchor bolts 287 and 287a for the front harrow gangs 242 and 244 are permanently located near the inner end of the gang frames 246 and 246a, and a little to the rear of a center line extending longitudinally of said gang frames. The pivot bolts 287 and 287a are also located so that they are spaced about the same distance from both the forward edge of the innermost discs 270 and 274a and the forward edge of the bumper washers 312 and 312a, so as to permit the gangs to revolve through the cycle of their entire adjustment without touching each other. This eliminates any need to adjust the gangs 242 and 244 or gang frames 246 and 246a toward the center or the outside of the implement at any time.

Two rear gangs of harrows 324 and 326, FIG. 3, are mounted upon the rear end of the main frame 2. These gangs are similar to the harrow gangs 242 and 244, except that the arrangement of the gangs of harrow discs 328 and 328a, respectively, is reversed, and the harrow frames 330 and 330a are slightly modified to provide a pivot point at a different region thereof from that of the frames 246 and 246a. Thus, the gang harriw 324 is mounted upon the frame 330, which is rectangular and includes angle iron side members 332 and 334 interconnected by a plurality of transverse members 336 similar to the members 254. The angle iron 332 has a lug 338 welded thereto at the rear inner corner of the frame 330, so that it projects therefrom on an angle of about 45°. The transverse angle iron 90 of the left frame section 8 has a series of spaced holes 340 formed therein inwardly of the angle iron 70. The lug 388 has an opening to receive an anchor bolt 342, which also extends through a selected one of the openings 340 to pivotally secure the gang 324 to the main frame 2. The gang frame 330 is further secured to the main frame 2 by the four J-bolts 344, 346, 348 and 350, similar to the J-bolts previously described. The J-bolt 344 extends through aligned holes 352 and 354 in the angle iron 70 of the right frame section 8 and in the flat member 50 of the rear frame section 6, respectively, for securing the frame member 332 to the main frame 2. The J-bolt 346 extends through aligned slots 356 and 368 in the transverse member 88 of the left frame section 8 and the angle iron 54 of the rear frame section 6, respectively. The frame component 68 has a series of longitudinally spaced holes 360 in any one of which the bolt 348 may be mounted, and a similar series of holes 362 in which the bolt 350 can be mounted, for securing the respective gang frame members 332 and 334 to the angle iron 68 of the frame section 8. A suitably apertured flat plate 363 is disposed between the main frame 2 and the gang frame 330 with the J-bolts 348 and 350 extending therethrough.

The frame 330a of the other rear harrow gang 326 is similarly mounted on the main frame 2 by a pivot or anchor bolt 342a extending through a selected one of a group of holes 340a in angle iron 90a, and by J-bolts 344a, 346a, 348a and 350a in the same manner as the gang frame 330. An apertured flat plate 363a is disposed between the main frame 2 and the gang frame 330a with the J-bolts 348a and 350a extending therethrough. The holes 340 and 340a permit the pivot bolts 342 and 342a to be mounted at varying distances from the longitudinal center line of the main frame 2 thereby to position the harrow gangs 324 and 326 closer together or farther apart, as a whole, as desired.

The pivot bolts 342 and 342a are also located in substantially longitudinal alignment with the rear trailing edge of the innermost discs 328 and 328a, respectively, of the right and left rear disc gangs 324 and 326. Such location will maintain the same distance between the aforesaid trailing edges throughout the range of angular setting of the disc gangs 324 and 326. The holes 340 and 340a also provide for adjusting the pivot points of the disc gangs 324 and 326 inwardly or outwardly to accommodate different sizes and concavities of disc blades and different tractor speeds.

The disc gangs 324 and 326 can be adjusted to a position substantially at right angles to the longitudinal center line of the main frame 2 for clod cutting, as is shown in dot-and-dash lines in FIG. 3. To this end, the outer angle irons 68 and 68a of the right and left frame sections 8 and 10 are provided with suitably spaced holes 364 and 366, and 364a and 366a, respectively. The holes 364 and 366 then receive the J-bolts 348 and 350, respectively, and the holes 364a and 366a receive the J-bolts 348a and 350a, respectively, as will be readily understood.

It will be apparent that the angular setting of the disc gangs provide for the desired toe-in on the front gangs 242 and 244, and a toe-out on the rear gangs 324 and 326. The front gang frames 246 and 246a, the rear gang frame 330 and 330a, and the supporting means for the gang discs are so designed that a slight camber is given to the gangs of discs. The camber effect provides for raising the outermost disc blades relative to the innermost disc blades on both the front and rear gangs, thereby creating camber, coupled with the caster or toe-in on the front blades and the toe-out on the rear blades. The inclination of the gangs of discs relative to each other and to the ground line, is best shown in FIGS. 4 and 7. The camber may raise the outer end of the gang discs as much as 2 or 2 ½ inches. The advantage of the camber is that it tends to pull the discs into the ground to effect deeper penetration. The flexibility of the main frame 2 does not negative the effect of the camber.

The degree of camber can be varied by inverting one or more pieces of flat metal, punched to receive the J-bolts, between the angle irons 68 and 68a of the main frame 2 and the outer end of the gang frames 246, 246a, 330 and 330a. In other words, the desired flat plates are inserted at all four corners of the main frame. By way of illustration, FIG. 4A shows sufficient plates 370 inserted between the main frame 2 and the gang frame 330a to remove all camber, should such mounting be desired.

The above described structure provides an extra heavy duty multi-disc harrow that is very rugged and will withstand the loads and stresses encountered in working fields overgrown with weeds and light brush. The transverse and diagonal flexibility of the main frame enables the same to follow the contour of the land even though the frame is of greater than normal width. The leveling mechanism maintains the main frame level with the ground, thereby providing for uniform depth of cut of the discs. The adjustable wheel carriage can be set to provide any desired depth of cut.

It will be understood that various changes may be made in the design, arrangement and proportions of the components of the heavy duty harrow disclosed herein without departing from the principles of the invention or the scope of the annexed claims.

I claim:

1. An implement frame construction, comprising: unitary front, rear, left side and right side frame sections, each of said frame sections including longitudinal and transverse components welded together; said front and rear frame sections being disposed between said left and right frame sections at the front and rear ends thereof and in longitudinally spaced relation; means securing adjacent components of said frame sections together in assembled relation and providing for transverse and diagonal flexing of the assembled frame; a wheel carriage assembly comprising a main shaft, wheels and arms (142) interconnecting said wheels and said shaft; bearings rotatably mounting said shaft on the longitudinal components of said left and right frame sections; and gangs of harrow discs mounted upon said left and right frame sections fore and aft of said wheel carriage assembly.

2. A frame construction as defined in claim 1, wherein the front frame section has a hydraulic cylinder pivotally mounted thereon; and wherein the shaft of the carriage assembly has a lever secured thereto; and wherein the hydraulic cylinder has a piston rod connected with said lever for angularly rotating the carriage shaft.

3. A frame construction as defined in claim 1, wherein the shaft has a pair of projections mounted thereon, one near each end, each of said projections having an opening; and wherein each of the side frame sections has a box-formation mounted on one of its longitudinal components to receive one of said projections; and wherein said box formations and said one longitudinal component having aligned openings for selectively receiving a pin to be passed through the opening in said projection for locking the wheel carriage assembly in position relative to said side frame sections.

4. A frame construction as defined in claim 3, including a draw bar pivotally connected to the front frame section.

5. A frame construction as defined in claim 4, including a leveling unit mounted upon the front frame section and interposed between the draw bar and the wheel carriage assembly for maintaining the main frame level with the ground at all times; and wherein the hydraulic cylinder is a component of the leveling unit.

6. In a harrow having a frame; a draw bar pivotally connected to said frame, front and rear gangs of harrow discs mounted on said frame, a wheel carriage assembly including a shaft and means pivotally mounting said shaft upon said frame between said front and rear gangs of harrow discs, said shaft having one end of a lever fixed thereto, the improvement comprising: a frame-leveling mechanism disposed between said lever and said draw bar, said frame-leveling mechanism including a hydraulic cylinder pivotally mounted at one end thereof on said frame and having a piston rod pivotally connected to said lever, and a linkage system pivotally connected at one end thereof to said lever and pivotally connected at its opposite end to said draw bar, said linkage system including a link and means directly connected to the draw bar at a point forwardly of the pivotal connection of said draw bar to said frame, a member connected with said link and being slidably mounted on said means, and compression springs positioned on said means on opposite sides of said slidable member tending to maintain the same in a position of equilibrium.

7. A harrow as defined in claim 6, wherein the linkage system includes: links having one end thereof pivotally connected with the lever on the wheel carriage shaft; a fulcrum lever having one end thereof pivotally connected with the frame and having its opposite end connected with the other end of said links; a second pair of links having one end thereof pivotally connected with said fulcrum lever at substantially the mid point thereof; a pair of uprights secured to the frame; a bell crank pivotally mounted upon said uprights and having a rearwardly extending arm connected with the other end of said second pair of links, said bell crank having forwardly extending arms; a bar pivotally connected with the forwardly extending arms of said bell crank; a pair of threaded members extending through said bar; springs on said threaded members on opposite sides of said bar, adjusting nuts on said threaded member for adjusting said springs so that the compression therein is equal, to thereby maintain the sliding bar in a position of equilibrium relative to said threaded members; and means connecting the draw bar with the lower end of said threaded members.

* * * * *